United States Patent Office 2,820,063
Patented Jan. 14, 1958

2,820,063

PRODUCTION OF ORGANIC THIOLS FROM ETHER AND HYDROGEN SULFIDE OVER PROMOTED ALUMINA CATALYSTS

Hillis O. Folkins, Crystal Lake, and Elmer Miller, Cary, Ill., assignors to The Pure Oil Company, Chicago, Ill., a corporation of Ohio No Drawing. Application October 15, 1954
Serial No. 462,609

11 Claims. (Cl. 260—609)

This invention relates to the preparation of lower molecular weight aliphatic thiols. It is also concerned with an integrated process for the manufacture of lower molecular weight aliphatic thiols by reacting separate amounts of hydrogen sulfide with separate portions of a lower molecular weight alcohol and a lower molecular weight alkyl ether, respectively.

The presence of hydrogen sulfide in refinery and natural gas limits the use of these gases as fuels, charge stocks for petro-chemical processes, etc. For the purification of these gases a plurality of gas-cleaning processes have been developed which produce, as a by-product, an off-gas which is relatively rich in hydrogen sulfide. The availability and reactivity of this hydrogen-sulfide-enriched gas makes its utilization an economic factor in the development of chemical processes. Accordingly, hydrogen sulfide has become important in the production of a number of chemicals. For example, considerable attention has been given to the preparation of elemental sulfur from hydrogen-sulfide-containing gases by processes using modifications of the original Claus oxidation technique. The presence of the sulfhydryl group also makes hydrogen sulfide an excellent sulfhydrating agent for use in the direct-approach syntheses of thiols wherein the sulfhydryl group is substituted in an organic nucleus. A number of organic reactants have been found suitable for interaction with hydrogen sulfide to produce organic thiols. One process which has been used commercially employs the reaction olefins and hydrogen sulfide which is carried out in the presence of a suitable catalyst, such as silica-alumina, or a Friedel-Crafts type. Another classic method of preparing aliphatic thiols by using hydrogen sulfide involves the use of an alcohol to produce the corresponding thiol. More recently it has been disclosed in the prior art that alkyl thiols of lower molecular weight can be prepared by reacting an aliphatic sulfide with hydrogen sulfide in the presence of an alumina catalyst promoted with cadmium sulfide. The thiols produced by means of these processes find considerable industrial application not only as intermediates in the preparation of drugs, insecticides and food supplements, but also as solvents, plasticizers, corrosion inhibitors, froth-flotation agents, etc.

According to this invention it has been found that lower molecular weight aliphatic thiols may be prepared by reacting an alkyl ether and hydrogen sulfide in the presence of alumina-containing catalysts. Although alumina, per se, is effective for promoting the reaction between an aliphatic ether and hydrogen sulfide to produce an aliphatic thiol, it is preferred to employ a promoted alumina catalyst in order to control the selectivity of the reaction. Suitable substances which may be used as promoters in the preparation of composite, promoted, alumina catalysts include the oxides of calcium, strontium, barium, magnesium, lithium, sodium, potassium, rubidium and cesium. The carbonates, phosphates, halides, sulfides, and sulfates of the alkali metals may also be employed. In addition, the heat-stable salts of an oxyacid of a metal selected from the group consisting of tungsten, molybdenum, uranium, vanadium and manganese are also effective. Of the foregoing promoters, it has been found that the use of heat-stable salts of tungstic, chromic, molybdic, uranic, vanadic, and manganic acids exhibit exceptional selectivity, providing conversions of 50 to 70% with a thiol selectivity of a magnitude of about 98%, selectivity being defined as the percent of the aliphatic ether reacted which was converted into an organic thiol. It is seen that thiol yields of about 50 to 70 mol percent can be obtained by means of the subject invention. The positive radical of these salts may be selected from a variety of cationic substituents including the alkaline earth metals, alkali metals, copper, aluminum, iron, nickel, cobalt, etc.

To illustrate the instant invention a number of thiol syntheses were carried out. It was found that methyl ether can be reacted with hydrogen sulfide to produce methanethiol with molal yields of about 70% per pass and with 96% selectivity when operating under the following conditions: temperature 750° F., atmospheric pressure, mol ratio $H_2S:Me_2O=2$, total gaseous space velocity about 210 (STP), and an alumina catalyst containing 10.8% by weight of potassium tungstate. Under the same conditions of operation, alumina alone gives a 33% yield at a 37% selectivity while an alumina catalyst containing 8.5% by weight of potassium carbonate gives a 41% yield with a selectivity of 91%.

The following examples also demonstrate the effectiveness of the instant invention for the preparation of higher molecular weight thiols: Ethanethiol may be prepared by reacting di-ethyl ether and hydrogen sulfide in the presence of activated alumina promoted with potassium tungstate or potassium carbonate. At reaction temperatures of 675° F., using a hydrogen sulfide/ether mol ratio of 2 with a space velocity of 200, using 10.8 wt. percent of potassium tungstate a conversion of 75 molal percent with a selectivity of 96% will obtain, while the use of sodium molybdate as a promoter will give a 68 molal percent conversion with a selectivity of 88%.

Activated alumina promoted with 8.0 wt. percent sodium chromate at a reaction temperature of 625° F. and a space velocity of 200 will facilitate the processing of reaction mixture containing 2 mols of hydrogen sulfide per mol of di-n-butyl ether to produce n-butylthiol at an 82 mol percent conversion with a selectivity of 85%. Under these same reaction conditions employing an activated alumina promoted with 8.5 wt. percent potassium carbonate, a conversion of 74 molal percent with a selectivity of 80% will result.

In the foregoing examples, a gas volume hourly space velocity was employed. This parameter is defined as the gas volume, at standard conditions of temperature and pressure, of the reactants used per hour per unit volume of catalyst in the reactor. From these examples, it is seen that not only excellent conversions are obtained but also the process of this invention provides for selectively producing the desired product with a minimum of side products. This selectivity feature of the catalyst is defined as the percent of reacted ether which was converted into the corresponding thiol.

The catalyst of this invention may be prepared by any of the techniques which are conventionally employed in catalyst manufacture. A uniform distribution of the metallic salt promoter throughout the alumina may be effected by permeating or impregnating alumina with a suitable salt solution; the coprecipitation method which involves precipitation from a mixture of metallic salts may be employed where appropriate; or, the catalyst may be prepared by admixing component compounds or precipitated components of the composite catalyst and processing in a suitable manner. The amount of metallic salt which may be added to the alumina to enhance its catalytic properties may be between about 1 by weight to 20% by weight and preferably between about 5-12% by weight, although in some instances amounts outside these ranges may be desirable.

The activated aluminas which may be employed in a major proportion in the composite catalyst are those types of sorptive aluminum oxides which in general have surface areas in excess of around 10 square meters per gram. Activated alumina resulting from either naturally occurring materials such as bauxites or those prepared synthetically may be used. A common variety is prepared by controlled calcination of a rock-like form of alpha alumina trihydrate. This type is exemplified by Alcoa Activated Alumina Grade F. A second variety typified by Alcoa Activated Alumina Grade H is composed of translucent granules prepared from a gelatinous alumina which has a high surface area even before any decomposition of the alumina hydrate is effected. A third type of sorptive alumina comprises discrete particles of such small size that they have appreciable area on their outer geometric surface. Examples of this type are Alcoa Activated Alumina R-2396 and Alcoa Activated Alumina XF-21. Activated aluminas resulting from other well known methods of preparation may be employed also. The size and shape of the catalyst will be determined by how the catalyst is to be employed. Desired physical forms may be obtained by adding the promoter to a granular, pelleted or fluid-type activated alumina, or by processing the finished catalyst to obtain the required shape and size.

The process of this invention is applicable to the reaction of hydrogen sulfide and aliphatic saturated ethers having the formula $R_1$—O—$R_2$ wherein $R_1$ and $R_2$ are alkyl radicals having not more than 8 carbon atoms per molecule. However, the radicals may have either the same number of carbon atoms or a different number of carbon atoms. Thus, symmetrical or unsymmetrical ethers may be reacted with hydrogen sulfide in accordance with the instant invention. Examples of such ethers include but are not limited to dimethyl, methyl-ethyl, di-ethyl, ethyl-hexyl, ethyl-iso-amyl, di-n-propyl, di-n-butyl, sec-butyl, butyl-ethyl ethers, etc. No particular advantage is to be had in the preparation of the higher molecular weight thiols by means of the instant invention because less selectivity is obtained where ethers having more than about 8 C atoms per alkyl radical are used. Thus a large portion of the reaction product will consist of undesirable by-products such as sulfides.

The hydrogen sulfide which is used in the process of this invention may be obtained from any convenient source. As it has been pointed out above, the tail gases of various petroleum refining processes or other industrial processes make an excellent economical source for suitable amounts of hydrogen sulfide.

In carrying out the invention, the reactants may be interacted in a single-stage reactor system utilizing a fixed, moving, or fluidized bed of the catalyst of this invention. The reaction effluent is then processed to recover the thiol. However, it may be preferred to employ the instant invention in conjunction with a thiol synthesis process wherein an alcohol is reacted with hydrogen sulfide. Although a number of catalysts have been developed for improving the selectivity of this process for the production of the thiol, it may be desired for economic or other reasons of convenience to utilize catalysts which are less selective in catalyzing the reaction between the alcohol and hydrogen sulfide. In such instances, a number of side reactions occur resulting in the production of substantial amounts of by-products which under normal circumstances would be considered undesirable. For example, in Table I are listed several catalysts which, in promoting the reaction between methanol and hydrogen sulfide to produce methanethiol, also produce substantial amounts of dimethyl ether.

Table I

| Catalyst | Molal ratio, $H_2S$:methanol | Gas space velocity | Conversion,[1] mol percent | Selectivity ($Me_2O$), percent |
|---|---|---|---|---|
| $Al_2O_3$-$K_2S$ (4.7%) | 2.0 | 200 | 75.8 | 15.7 |
| $Al_2O_3$-$K_2SO_4$ (7.4%) | 2.0 | 200 | 70.6 | 19.9 |
| $Al_2O_3$-$K_2CO_3$ (8.5%) | 0.6 | 200 | 68.8 | 33.1 |

[1] Reaction temperature, 750° F.

When thiol syntheses are carried out employing these catalysts in order to effect more economically and improve the ultimate yield of thiol produced from the basic reaction of alcohol and hydrogen sulfide, the subject invention could be used to process the ether by-product formed during the course of the main reaction between the alcohol and hydrogen sulfide. Thus, in a primary reactor hydrogen sulfide and an alcohol can be reacted in the presence of a suitable catalyst under suitable reaction conditions to produce a reaction effluent which, in addition to the desired thiol, contains substantial amounts of ether. The effluent from the primary reactor is processed in a recovery system to fractionate therefrom separate streams of thiol and ether. The latter by-product of the reaction is then recycled to a secondary reactor wherein it is interacted with additional amounts of hydrogen sulfide and in the presence of the catalyst of this invention and converted into additional amounts of thiol. In employing an integrated process of this nature, separate recovery systems may be employed for processing the effluent from each of the reactors. However, a common product recovery system can be advantageously employed because of the similar nature of the reaction effluent recovered from the primary and secondary reactor. A number of separation processes can be employed in the recovery system. For example, the principles of fractional condensation and stabilization may be employed or in the alternative, the principles of absorption may be utilized. Suitable recovery systems employing both of these principles may be used. In the production of the higher molecular weight thiols, some changes in the recovery system as determined by the nature of the products will be necessary. For example, in the preparation of the lower molecular weight thiols, the reaction product upon condensation is an admixture of normally gaseous and normally liquid products. Obviously, the recovery system will have to be designed to handle this heterogeneous mixture. The recovery of the higher molecular weight thiols is somewhat simpler inasmuch as these products are mainly liquids with low vapor pressures and entrainment with the residual hydrogen sulfide is the only factor of importance. In the use of the catalyst of the present invention for promoting the reaction between hydrogen sulfide and an ether, temperatures between about 400°–800° F. may be employed. Generally, optimum temperatures will be lower than the higher molecular weight ethers are employed as reactants. In the reaction between di-methyl ether and hydrogen sulfide to produce methanethiol, preferred temperatures are in the range of 700°–800° F. With the higher molecular weight ethers, such as ethyl ether, n-propyl ether, n-butyl ether, etc., preferred temperatures are in the range of 400°–750° F. Pressures may vary widely. Superatmospheric pressures up to about 200 pounds per square inch gauge are preferable, although higher pressures may be used. However, the reaction also may be carried out at subatmospheric or atmospheric pressure. The mol ratio of the reactants may range from about 2 to about 5 mols of hydrogen sulfide to 1 mol of ether. Although it is generally preferred to maintain an excess of hydrogen sulfide in the reactant mixture, it may be desirable to employ substantially stoichiometric proportions in order to avoid unnecessary complications that may occur, for example, in the recovery system. Throughput rates will vary with the temperatures and will in general be from about 0.3 to about 5 volumes of liquid ether per volume of catalyst per hour. This variable also is known as the liquid volume hourly space velocity as distinguished from the gas space velocity defined above.

The foregoing examples are only illustrative of the application of this invention to the preparation of thiols. Modifications of the subject invention may be made by those skilled in the art and it is therefore intended that this invention be limited only in the manner as set forth in the appended claims.

We claim:

1. A method for producing a $C_1$–$C_8$, aliphatic, organic thiol by the reaction between hydrogen sulfide and a saturated aliphatic ether having the general formula R—O—R where R is an alkyl substituent having not more than 8 carbon atoms which comprises reacting hydrogen sulfide under the following conditions:

| | |
|---|---|
| Temperature °F | 400–800 |
| Ether/$H_2S$, mol ratio | 2–5:1 |
| Liquid volume hourly space velocity | 0.3–5 | in the presence of a catalyst consisting essentially of a major portion of activated alumina having incorporated therein about 1–20% by weight of at least one promoting agent selected from the group consisting of the tungstates, chromates, molybdates, and carbonates of the alkali metals.

2. A method in accordance with claim 1 in which the promoting agent is an alkali metal tungstate.

3. A method in accordance with claim 2 in which the alkali metal tungstate is potassium tungstate.

4. A method in accordance with claim 1 in which the promoting agent is an alkali metal carbonate.

5. A method in accordance with claim 4 in which the alkali metal carbonate is potassium carbonate.

6. A method for producing methanethiol by the reaction between hydrogen sulfide and dimethyl ether which comprises reacting hydrogen sulfide under the following conditions:

| | |
|---|---|
| Temperature °F | 700–800 |
| Ether/$H_2S$, mol ratio | 2–5:1 |
| Liquid volume hourly space velocity | 0.3–5 | in the presence of a catalyst consisting essentially of a major portion of activated alumina having incorporated therein about 1–20% by weight of at least one promoting agent selected from the group consisting of the tungstates, chromates, molybdates, and carbonates of the alkali metals.

7. A method in accordance with claim 6 in which the promoting agent is an alkali metal tungstate.

8. A method in accordance with claim 7 in which the alkali metal tungstate is potassium tungstate.

9. A method in accordance with claim 6 in which the promoting agent is an alkali metal carbonate.

10. A method in accordance with claim 9 in which the alkali metal carbonate is potassium carbonate.

11. A method for producing methanethiol by the reaction between hydrogen sulfide and dimethyl ether which comprises reacting hydrogen sulfide at a temperature of 750° F., atmospheric pressure and a methyl ether/hydrogen sulfide ratio of 2 in the presence of an activated alumina catalyst promoted with 10–15% potassium tungstate.

References Cited in the file of this patent

UNITED STATES PATENTS

| | | |
|---|---|---|
| 2,116,182 | Baur | May 3, 1930 |
| 2,035,121 | Frolich | Mar. 24, 1936 |
| 2,514,300 | Laughlin | July 4, 1950 |

OTHER REFERENCES

Jurjew: Ber. Deut. Chem. 69, 1002–1004 (1936).

Dunlop and Peters: The Furans, 664–665 (1953), A. C. S. Monograph Series No. 119, Reinhold Pub. Co., New York, N. Y.

"The Furans" (Dunlop and Peters), published by Reinhold (New York), 1953 (page 663 relied on).